Nov. 27, 1934.  F. STEBLER  1,982,082
DRYING APPARATUS
Filed Oct. 7, 1931

INVENTOR.
Fred Stebler.
BY
Philip A. Minnis
ATTORNEY.

Patented Nov. 27, 1934

1,982,082

UNITED STATES PATENT OFFICE 1,982,082

DRYING APPARATUS

Fred Stebler, Riverside, Calif., assignor to Food Machinery Corporation, San Jose, Calif., a corporation of Delaware Application October 7, 1931, Serial No. 567,398

2 Claims. (Cl. 34—12)

This invention relates to apparatus for drying fruit and the like and has particular reference to a new and improved construction adapted to efficiently and gently dry wet fruit such as apples, oranges, and the like.

Such fruit as it comes from the orchard is usually very dirty, being covered with an accumulation of dust and spray residue, so that it must be washed prior to placing it on the market. The washed fruit must then be dried before being packed for shipment as otherwise decay would be accelerated.

In drying apparatus heretofore used it has been the custom to provide a conveying mechanism adapted to convey the fruit through the dryer in a path to subject it to the action of some form of drying means arranged adjacent the conveyor. Such machines are of relatively large size and require a comparatively long time to accomplish the drying.

By making use of apparatus embodying the principles of my invention I have found that the fruit may be efficiently dried in materially less time than formerly was required, and the apparatus required for this purpose occupies a less amount of floor space.

For the accomplishment of these results I employ a conveyor for conveying the fruit through the apparatus, which conveyor, however, differs from those heretofore used in that it is adapted to assist in drying the fruit as well as conveying the same. For this purpose, the conveyor includes a plurality of rotatable supporting rollers having absorbent surfaces so that as the pieces of fruit are carried through the apparatus, they are rolled about upon the rollers and the moisture is transferred from the fruit to the absorbent surfaces of the rollers.

Preferably there is also provided means for directing a draft of air downwardly upon the fruit resting on the conveyor whereby the air both aids in drying the fruit and likewise serves as a drying medium for the absorbent rollers whereby they are prevented from becoming so saturated as to nullify their drying efficiency.

It is the general object of this invention to provide a fruit drying apparatus including a conveyor adapted to both dry and convey the fruit.

More specifically it is an object to provide a fruit dryer having a conveyor including a plurality of absorbent surfaced supporting rollers.

Another object of the invention is to provide a fruit dryer having a conveyor including a plurality of absorbent surfaced supporting rollers, and means for directing a draft of air against the fruit and rollers whereby they are both dried.

Further objects and advantages will become apparent as the description proceeds in connection with the accompanying drawing wherein is illustrated a preferred form of the invention.

Figure 1:
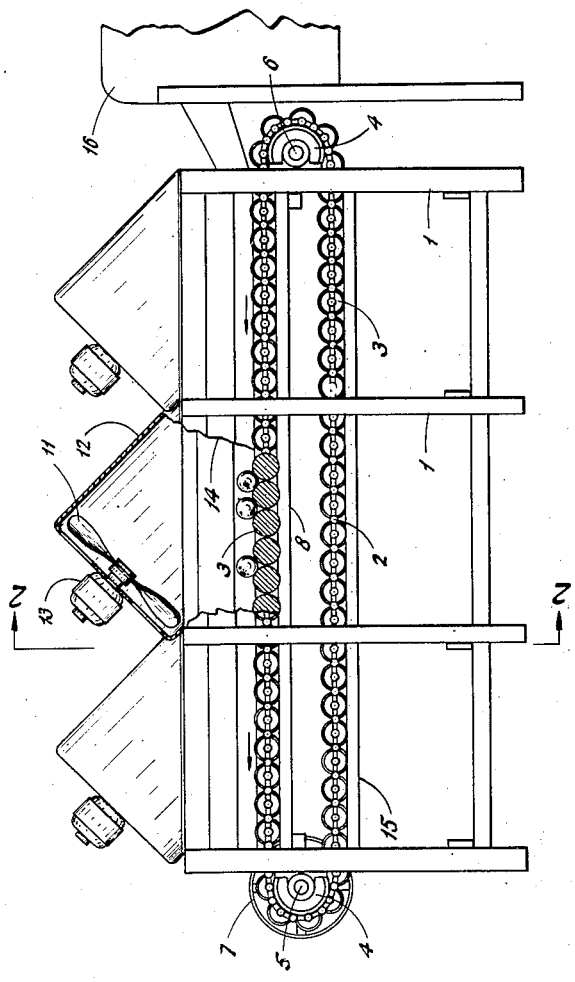
Figure 1 is a side view, partly in section.

As illustrated, the dryer comprises a suitable framework supported by uprights 1 and upon which is mounted a conveyor of the endless type including the endless chains 2 to which are attached a series of transverse rotatable rollers 3 arranged in closely spaced relation so as to form a support for the fruit to be dried. The chains 2 pass around sprockets 4 at each end of the machine, said sprockets being carried by shafts 5 and 6. The shaft 5 is provided with a driving pulley 7 to which power may be supplied so as to drive the conveyor in the direction indicated by the arrows.

The upper or working run of the conveyor is supported by a pair of longitudinal rails 8 upon which rest the outer ends of the conveyor rollers, and this construction serves to prevent sagging of the conveyor and also causes rotation of the rollers as they pass over the rails, whereby pieces of fruit resting on the rollers are rolled about as they are advanced so as to present all parts of their surfaces to the rollers.

Figure 3:
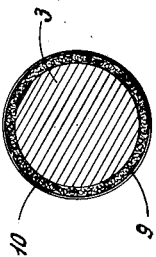
Figure 3 is an enlarged sectional view of one of the conveyor rollers illustrating the absorbent covering.

The conveyor construction thus far described is well known in the art, but whereas heretofore such conveyors have been utilized solely to convey fruit through the machine, I have so constructed them that they also serve as a drying means for the fruit. To this end, as best shown in Figure 3, the conveyor rollers are covered with an absorbent material 9 such as towelling, felt, or the like. Where an absorbent material such as felt is used, which is likely to become scuffed during use, it is preferably protected by a covering of thin porous material 10 such as loosely woven canvas or other net-like material.

By reason of the absorbent coverings of the rollers 3 it will be seen that as wet fruit is deposited thereon the moisture is transferred to the absorbent material thus drying the fruit, and the rotation of the rollers as they advance insures that the pieces of fruit will be sufficiently rolled about to bring all their surfaces into contact with the rollers.

In practice however it has been found that while the construction thus far described will effectively dry fruit for a time, after the apparatus has been in operation for a while the absorbent material becomes so saturated that its effectiveness as a drying agent is seriously impaired. I have therefore provided an auxiliary drying means which not only assists in drying the fruit, but also serves to evaporate moisture from the conveyor rollers, thus maintaining their drying efficiency.

Such auxiliary drying means takes the form of a plurality of fans 11 mounted in enclosing hoods or casing 12 above the conveyor, and driven by electric motors 13. The hoods are adapted to direct the air from the fans downwardly against the conveyor and slightly rearwardly. An open ended casing 14 extends downwardly from the hoods to the conveyor to confine the air currents to the conveyor surface and insure that the air will pass downwardly through the spaces between the conveyor rollers in the upper run of the conveyor and against the rollers in the lower run. The rollers in the lower run are supported by rails 15 in the same manner as those in the upper run so that they are also caused to rotate as the conveyor is operated and thus present their entire surfaces to the blast of drying air from above.

Figure 2:
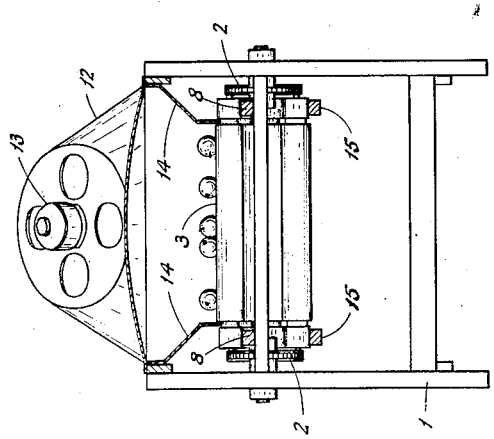
Figure 2 is a sectional view taken along the line 2—2 of Figure 1.

As best seen in Fig. 2, the side walls of the housing 14 are contracted inwardly so that their lower edges terminate a short distance inwardly from the ends of the rollers 3, thereby leaving the end portions of the rollers which rest upon the tracks 8, outside the housing, as well as the driving chains 2. By this construction, the fruit is prevented from coming into contact with the driving chains and the chains are protected from moisture carried from the fruit by the air blast. Moreover, the end portions of the rollers outside the housing walls need not be covered with absorbent material since the fruit does not come into contact with these portions, and there is no wear on the absorbent coverings from frictional contact with the supporting tracks 8 and 15. The rollers are also provided with reduced portions adjacent their ends in the form of circumferential grooves into which the lower edges of the side walls of the housing 14 project. By this construction the edges of the housing walls extend downwardly beside the shoulders formed on the rollers by the grooves and prevent small pieces of fruit from being squeezed off the rollers underneath the housing walls as frequently occurs where the walls do not extend down into the valleys between the rollers.

The operation of the apparatus will now be apparent. The wet fruit may be delivered to the drier directly from the washer 16 and as it is carried along by the rotating rollers 3 it is rolled about so that all sides are presented both to the absorbent rollers and to the blast of drying air from the fans above. The conveyor rollers are subjected to the air blast twice in each circuit of the conveyor, once in the upper run and then again in the lower run, the rollers being rotated in both runs so that they may be effectively dried by the air blast, and in this manner their drying efficiency is maintained.

Having now described my invention and in what manner the same may be used, what I claim as new and desire to protect by Letters Patent is as follows:

1. A fruit dryer, comprising an endless conveyor composed of a series of rollers arranged in parallel, side by side relation, and interconnected by a pair of endless chains secured to their end faces, each of said rollers being provided inwardly of each end with a circumferential groove and having a covering of absorbent material intermediate said grooves, a housing above the conveyor having side walls extending lengthwise of the conveyor and projecting downwardly into the grooves in the rollers of the upper reach of the conveyor, a trackway extending lengthwise of the conveyor at each side thereof beneath the end portions of the rollers outwardly of said grooves for supporting and rotating the rollers, and means for discharging a blast of drying air into the housing.

2. In a fruit drying apparatus, a conveyor upon which the fruit may be supported and advanced, said conveyor including a plurality of rotatable absorbent surfaced supporting rollers arranged in side by side relation to support conveyed fruit between them, means for imparting rotation to said rollers, and means arranged above said conveyor for directing a blast of air downwardly thereagainst.

FRED STEBLER.